No. 640,697. Patented Jan. 2, 1900.
J. E. PEARSON.
HOOK FOR HOOKS AND EYES.
(Application filed May 9, 1899.)
(No Model.)
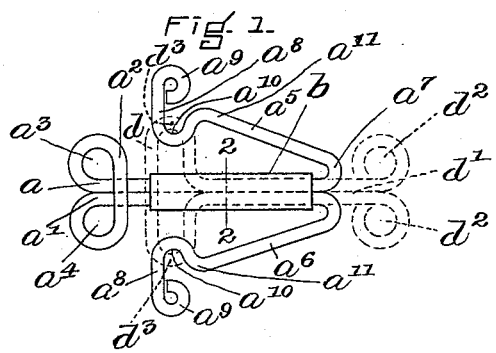
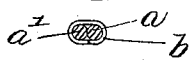
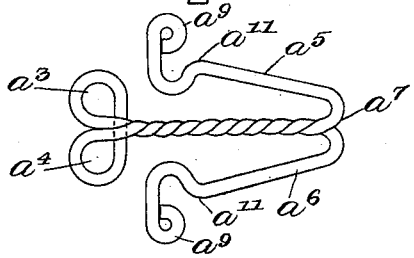
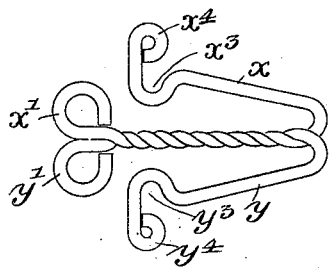
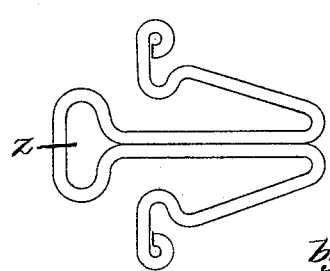
WITNESSES.
A. D. Grover.
Fred E. Dorr.
INVENTOR.
Jacob E. Pearson.
by Edwin S. Beach
his Atty.

UNITED STATES PATENT OFFICE.

JACOB E. PEARSON, OF BOSTON, MASSACHUSETTS.

HOOK FOR HOOKS AND EYES.

SPECIFICATION forming part of Letters Patent No. 640,697, dated January 2, 1900.

Application filed May 9, 1899. Serial No. 716,182. (No model.)

*To all whom it may concern:*

Be it known that I, JACOB E. PEARSON, a citizen of the United States, residing at Boston, in the county of Suffolk and State of Massachusetts, have invented certain new and useful Improvements in Hooks for Hooks and Eyes, of which the following is a specification, reference being had therein to the accompanying drawings.

The object of my invention is to produce a new garment-hook which is of economical construction and is readily freed from the eye.

Figure 1 is a plan view of my new hook and also shows in dotted lines a form of eye adapted for use with the hook. Fig. 2 is a sectional detail on line 2 2 of Fig. 1. Figs. 3, 4, and 5 show modifications.

In the drawings illustrating the principle of my invention and the best mode now known to me of applying that principle the hook is made from a single piece of wire doubled to form the twin shank or body-bar $a$ $a'$ and looped at $a^2$ crosswise of the shank, near the rear or butt end thereof, to form the eyes $a^3$ and $a^4$, through which thread may be passed to sew the hook on the garment. The outer portions $a^5$ and $a^6$ of the wire are bent rearwardly from the front end $a^7$ of the shank or body-bar and form spring-arms, which stand outwardly from the shank from the front end $a^7$ thereof to their outer free end portions $a^8$, which are preferably rounded to form convenient thumb-pieces $a^9$ for compressing the spring-arms to release the eye. Preferably, but not necessarily, in order to give rigidity to the shank and to the whole hook and to prevent the members of the shank from becoming accidentally bent away from one another, the shank or body-bar members are locked together conveniently by the encircling band $b$, of sheet metal, compressed upon the shank; but the shank or body-bar members may be locked together in various other ways.

Near the outer ends of the spring-arms the same are inwardly bent to form the eye-receiving sockets $a^{10}$, from which the end portions $a^8$ extend outwardly very nearly at right angles to the body-bar. The inner sides of these end portions $a^8$ limit the inward movement of the eye when its hook-receiving loop is in place in the sockets $a^{10}$.

In Fig. 1 an eye suitable for use with my new hooks is shown in dotted line, $d$ being the hook-engaging loop, $d'$ the shank of the eye, and $d^2$ the thread or fastening openings of the eye. Loop $d$ is passed over the outer end of the hook and is of less interior distance between its ends $d^3$ $d^3$ than the distance between the bends $a^{11}$ $a^{11}$ of the spring-arms $a^5$ and $a^6$, so that the spring-arms are compressed by the passage of the eye-loop $d$ over the bends $a^{11}$ $a^{11}$ into the sockets $a^{10}$ $a^{10}$. The eye is thereby held in place in the sockets $a^{10}$ by the outward pressure of the spring-arms, the walls $a^8$ of the sockets toward the front end of the hook forming abutments against which the eye-loop impinges when the hook and eye are strained apart.

My new hook is neat in appearance, forms with the eye a novel, cheap, and secure fastening for garments and the like, is of such construction that the eye cannot become seriously entangled with the hook, and is readily released from the eye when desired. Solder may be used to lock the shank members together in lieu of the band $b$, if so desired.

In all forms of my hook the thread receiving or fastening eye or eyes are in the plane of the shanks and project on opposite sides of the shank, which is made stiff either by the bonding together of its members in some suitable way, as herein described, or by forming the shank members one against the other. I do not intend to limit my invention to bonded shanks, but bonding gives a material and useful stiffness to the shanks, which is very desirable, especially in large-sized hooks. The front end portions of the spring-arms are in the same plane or substantially the same plane as the shanks, and this is also true of the thread-receiving eyes or eye, which, being on or projecting from opposite sides of the shank, permit the hook to be properly fixed on a garment, with one of its flat sides permanently against the garment, the hook, owing to its described construction, projecting but little from the surface of the garment even when the eye is in place.

In Fig. 3, showing a slight modification, the shank members are locked together by twisting together the portions of the wire which make up the shank. In this form the hook is made from a single wire.

In Fig. 4, showing another modification, the hook is made from two wires $x$ and $y$, which are locked together at the shank or body-bar portion of the hook by twisting, the butt-end of wire $x$ being formed into a thread or fastening eye $x'$ and the butt-end of wire $y$ being formed into a thread or fastening eye $y'$. The front end portions $x^2$ and $y^2$ are bent rearwardly from the front end of the shank or body-bar and formed with eye-loop receiving-sockets $x^3$ $y^3$ and thumb-pieces $x^4$ and $y^4$, as in the preferred form.

In Fig. 5 I show another modification which is made from a single wire and is in all respects like the structure of Fig. 1, except that the shank members are not locked together and the butt-end of the shank formed into a single fastening-eye $Z$, formed by a simple enlargement of the wire with looping it across the shank.

What I claim is—

1. As a new article of manufacture, the herein-described hook of "hooks and eyes," said hook comprising a shank composed of two integral members which are formed one against the other in the plane of the spring-arms, and having a fastening-eye at its butt-end and spring-arms extending rearwardly from the front end of the shank, on two opposite sides thereof; each spring-arm having an eye-receiving socket and an outward extension near its outer end, the fastening-eye projecting laterally in the plane of the shank and spring-arms, from each side of the shank.

2. As a new article of manufacture, the herein-described hook of "hooks and eyes," said hook comprising a shank having a plurality of members locked together, and the shank being formed at its butt-end with a fastening-eye and having a pair of spring-arms which extend rearwardly from its front end, on its opposite sides; said spring-arms each having an eye-receiving socket and an outward extension, the fastening-eye projecting laterally in the plane of the shank and spring-arms, from each side of the shank.

3. As a new article of manufacture, the herein-described "hooks and eyes," said hook being formed from a single wire doubled to form the hook-shank and looped across the shank near the butt-end thereof to form a fastening-eye on each side of the butt-end of the shank; the forward portions of the wire being bent rearwardly from the front end of the shank and forming spring-arms which are provided near their outer ends with eye-receiving sockets and outward extensions.

In testimony whereof I affix my signature in presence of two witnesses.

JACOB E. PEARSON.

Witnesses:
 EDWARD S. BEACH,
 E. A. ALLEN.